United States Patent
Frenkel

[11] 3,823,735
[45] July 16, 1974

[54] UNIFLOW VALVE

[76] Inventor: Mark Isaakovich Frenkel, ulitsa 6, korpus 2, kv. 20, Leningrad, U.S.S.R.

[22] Filed: Nov. 11, 1971

[21] Appl. No.: 197,686

[52] U.S. Cl............... 137/512.15, 137/516.11
[51] Int. Cl............................. F16k 15/16
[58] Field of Search......... 137/512.1, 512.15, 512.4, 137/516.11, 525.3

[56] References Cited
UNITED STATES PATENTS

| 1,632,155 | 6/1927 | Vollmann | 137/512.1 |
| 1,672,436 | 6/1928 | Thege | 137/525.3 |
| 2,408,056 | 9/1946 | Farmer | 137/512.15 |
| 2,417,246 | 3/1947 | Ferguson | 137/512.15 X |
| 2,781,777 | 2/1957 | Oxnam | 137/512.1 X |
| 2,985,188 | 5/1961 | MacDonald | 137/512.1 X |
| 3,099,998 | 8/1963 | Fisher | 137/516.11 X |
| 3,312,388 | 4/1967 | Brandin et al. | 137/516.11 X |
| 3,438,390 | 4/1969 | Brown | 137/512.1 |

FOREIGN PATENTS OR APPLICATIONS

| 496,795 | 12/1938 | Great Britain | 137/512.1 |

Primary Examiner—Robert G. Nilson
Attorney, Agent, or Firm—Waters, Roditi, Schwartz & Nissen

[57] ABSTRACT

A uniflow valve comprising a pack of flexible plates alternating with valve seats having portions of varying thickness. The flexible plates have inlet channels for the working fluid and at least some part of the flexible plates have teeth which close the fluid inlet channels on the length from the roots to the tops of the teeth. The valve seats are provided with fluid outlet channels facing the spaces between the teeth.

8 Claims, 7 Drawing Figures

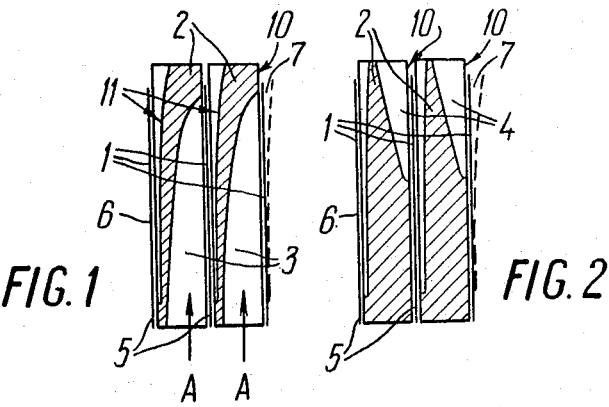
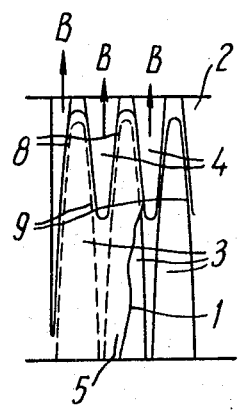
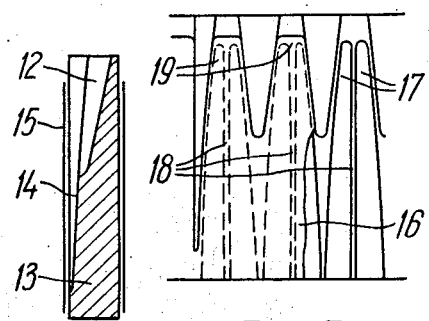
FIG. 1    FIG. 2    FIG. 3    FIG. 4    FIG. 5
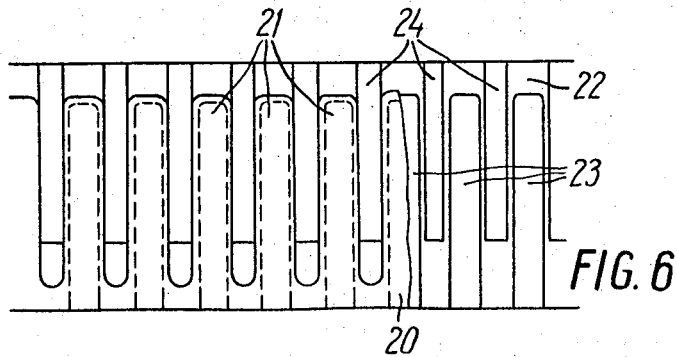
FIG. 6

UNIFLOW VALVE

The present invention relates to the uniflow valves used in compressors and positive-displacement pumps, particularly in piston compressors.

Known in the art is a uniflow valve comprising a pack of adjoining and alternating flexible plates and valve seats having portions of varying thickness.

The valve seats have fluid inlet channels in which the fluid flows over the plate surface and have a surface contacting the plate when the valve is closed and another surface limiting the motion of the plate when the valve is open.

One of the plate edges located at the side where the fluid enters the valve is clamped between the seats while the other edge, located at the fluid outlet side, is free and can be bent by the pressure of the fluid flowing through the valve along the plate surface.

When the valve starts to open, au opening for the discharge of the working fluid is formed between the free edge of the plate and the surface of the seat. In a fully open valve the plate comes against the seat surface which limits its motion.

The basic hydraulic resistance of the valves, including the uniflow type, is offered by their outlet opening whose passage area is smaller than the other passage areas in the valve on the route of the fluid flow. Therefore, to increase the flow rate through the valve and, as a consequence, to reduce the energy losses in it, an increase of the passage area through the outlet opening is of paramount importance.

In the existing uniflow valves with plates whose free edge is rectilinear, the passage area through the outlet opening is increased by increasing the plate lift. However, this cuts down the life of the plates and impairs the reliability of the valves.

Small passage areas through the opening call for an increased number and length of the plates and seats; this increases the valve diameter and the dead space in the cylinder and requires more labour and materials in manufacturing the valve.

An object of the invention resides in eliminating the aforesaid disadvantages.

The main object of the invention is to provide a uniflow valve with a lower hydraulic resistance, more economical and durable due to a reduced plate lift and weaker impacts against the seats.

This object is accomplished by providing a uniflow valve comprising a pack of flexible plates alternating with valve seats including portions of varying thickness which have inlet channels for the working fluid flowing through said channels along the plate surface, said valve seats being provided with a surface contacting the plate when the valve is closed and another surface which limits the motion of said plate when the valve is open wherein, according to the invention, at least some part of the flexible plates have teeth which close the fluid inlet channels on the length from the roots to the tops of the teeth whereas the valve seats are provided with fluid outlet channels facing the spaces between the teeth.

Such an arrangement increases the economy and extends the life of the valve.

It is most practicable that each plate of the valve should be provided with teeth.

In order to reduce gas-dynamic losses, it is practicable that each tooth should be located opposite one fluid outlet channel.

For better tightness and simpler manufacture, it is practicable that one tooth should be located opposite several fluid inlet channels.

If the uniflow valves are round so that the length of the seats varies in accordance with the valve circumference and the fluid inlet and outlet channels must be located on a predetermined length of the seats, it may be practicable to arrange part of the teeth so that each of them would face one fluid inlet channel while the other teeth would be arranged so that each of them would face several fluid inlet channels.

The fluid outlet channels can be located in the valve seat at the side of the surface contacting the plate in the closed valve.

The fluid outlet channels can also be located in the valve seat at the side of the surface which limits the motion of the plate in the open valve.

Finally, the fluid outlet channels can be located both at the side of the surface contacting the plate in the closed valve and at the side of the surface which limits the motion of the plate in the open valve.

Now the present invention will be described in detail by way of example with reference to the accompanying drawings, in which:

FIG. 1 is a cross section through a part of the seat pack with fluid inlet channels and with plates contacting the seats;

FIG. 2 is a cross section through a part of the seat pack with fluid outlet channels and with plates contacting the seats;

FIG. 3 illustrates a seat with a plate, each tooth of which closes one fluid inlet channel;

FIG. 4 is a sectionalized view of the seat according to the invention wherein the fluid outlet channel is located at the side of the surface limiting the motion of the plate;

FIG. 5 shows another version of the seat and plate of the uniflow valve wherein each tooth of the plate closes two fluid inlet channels, according to the invention;

FIG. 6 shows still another version of the valve seat and plate wherein the plate teeth and the fluid inlet and outlet channels have a constant width in the direction of the fluid flow.

Figure 7:
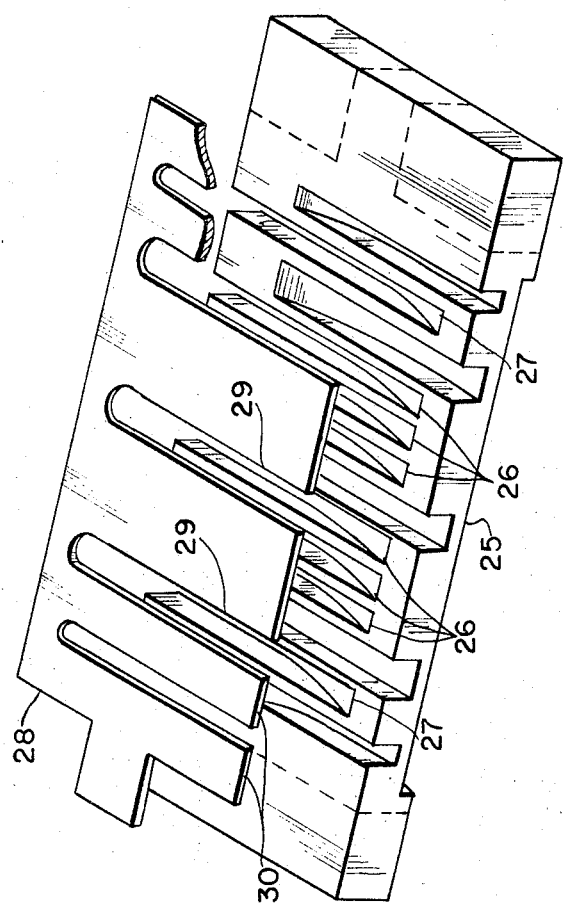
FIG. 7 shows, in a perspective view, another embodiment of the valve seat and plate in which some of the teeth of the plate face a single fluid inlet channel and other teeth face several fluid inlet channels.

The uniflow valve according to the invention comprises a pack of flexible plates 1 (FIGS. 1, 2) alternating with valve seats 2 with fluid inlet and outlet channels 3 and 4, respectively.

The plates 1 are located between the adjacent seats 2 so that one portion 5 of the plate 1 located at the fluid inlet into the valve (along arrows A) is clamped between said seats and is, therefore immovable. The portion 6 of the plate 1 remains free and can be bent off by the pressure of the fluid flowing through the valve over the surface of the plate 1 (the bent-off plate is shown in FIGS. 1, 2 by dotted lines) thus forming an opening 7 between the plate 1 and seat 2. for the working fluid.

To increase the length and the passage area through the valve opening 7, the plate 1 is provided with teeth 8 (FIG. 3) which close the fluid inlet channel 3 along the contour 9.

The toothed shape of the plates enables the valve openings to be made substantially longer without increasing the length of the plate, thus reducing the resistance of the uniflow valve since the openings are usually the most restricted points in the valves and offer the main hydraulic resistance.

The fluid outlet channels 4 (along arrows B) of the seats 2 face the spaces between the teeth 8 of the plate 1 and are also provided before the first tooth and after the last tooth.

The valve seat 2 has a surface 10 (FIG. 1) contacting the plate 1 when the valve is closed and provided with fluid inlet channels, and another surface 11 which limits the motion of the plate when the valve is open.

The fluid outlet channels can be of different designs: e.g., channels 4 (FIG. 1) located in the valve seat at the side of the surface 10 contacting the plate in the closed valve, or channels 12 (FIG. 4) located in the valve seat 13 at the side of the surface 14 limiting the motion of the plate 15 in the open valve, or channels located on both of these sides.

The number, dimensions and profile of the teeth which are selected to suit the length and width of the seats, the allowable plate lift and the valve operating conditions may vary too.

The narrower and higher the teeth, the greater is the distance by which the perimeter of the valve opening is larger than the width of the free portion of the plate.

All the above-quoted embodiments of the valve use seats with an increased thickness which involves an increase in the section of the valve opening and requires a larger depth of the fluid inlet channels.

The increased thickness of the seats improves considerably their stiffness. This becomes most efficient in the uniflow valves of a round shape where distortion of the seats during installation of the clamping rings impairs the tightness of the valve.

An increased depth of the fluid inlet channels and thickness of the seats reduces the number of the seats and plates of the valve. This facilitates the manufacture of the valves as compared with the existing uniflow valves, and cuts down considerably the amount of the special steel strip used for making the valve plates.

A reduction of the pressure losses in the valve ensured by a weeker friction of the gas flowing through the larger seat channels constitutes an additional factor promoting the economy of the valve according to the invention.

Depending on the pressure difference applied to the plate, on the plate thickness and tooth width, the fluid inlet channel 3 located under each of the teeth 8 is either single (FIG. 3) or, to avoid considerable bending of the plate 16 into the channel, the channel 17 (FIG. 5) is of a double, triple or quadruple type, i.e., divided by longitudinal partitions 18 which support the teeth 19 of the plate 16; said partitions may be either continuous or broken in length and may come short of the end of the fluid inlet channel 17.

The depth and width of the fluid inlet channels decreases (see FIGS. 1, 3, 5) in the direction of gas flow because some part of the gas flows out through the gaps on the sides of the plate teeth. Conversely, the depth and width of the fluid outlet channels inverease (see FIGS. 2, 3, 5) in the direction of the fluid flow since the gas enters these channels through the same gaps.

The provision of the teeth on the plates somewhat interferes with the straightness of the gas flow through the valve and reduces the discharge coefficient of the valve referred to the passage area through the valve opening. But the increase of the passage area through the valve opening proves to be considerably larger than the reduction of the discharge coefficient. And the equivalent area of the valve which is equal to their product is considerably increased which is just the fact proving the efficiency of the uniflow valve according to the present invention.

The provision of the plates with teeth makes it possible not only to reduce the valve resistance but also to diminish the plate lift which, eventually, extends the valve life. Besides, the functioning and service life of the valve are less affected by poor quality of the valve strip, (such defects as coiling and twisting).

Shown in FIG. 6 is the simplest and most convenient version of plates 20 with rectangular teeth 21 and seats 22 provided with constant-width inlet and outlet channels 23 and 24, respectively.

In this version, each tooth 21 of the plate 20 closes only one fluid inlet channel 23. However, the valve can be made with several or all rectangular teeth closing two or more fluid inlet channels, similarly to the arrangement shown in FIG. 5.

The valve plates with rectangular teeth and seats with constant-width channels shown in FIG. 6 are also more effective than the plates with teeth tapering towards the top and fluid inlet channels (FIGS. 3 and 5) because the wider ends of the teeth are subjected to stronger pressure of the inflowing stream of the working fluid and this factor, ensuring a complete opening of the valve at a lower pressure difference, reduces the energy losses in the valve.

In the embodiment of FIG. 7, the valve includes a valve seat 25 having seat portions of varying thickness in which some of the seat portions have a plurality of fluid inlet channels 26, and other seat portions a single fluid inlet channel 27. The plate 28 includes toothed portions 29 each covering the plurality of channels 26, and toothed portions 30 each covering a single channel 27.

The plates with the teeth tapering towards the top as shown in FIGS. 3 and 5 possess a smaller mass near the free edge and have, therefore, a smaller inertia. A shorter valve closing and opening time which is due to the above factor also makes the valves with such plates very effective in high-speed compressors.

The heaviest stresses arise in the plates, as a rule, during closing, when the plate strikes the seat. In the uniflow valves the heaviest stresses in the plate are concentrated near the free edge which moves at the highest speed during the impact, the bending stresses at this point increasing with the width of the fluid inlet channels at the free edge of the plate because the latter bends at the impact into the fluid inlet channels. The width of the channels in the uniflow valve with toothed plates varies, being smallest at the tooth tops (FIGS. 3 and 5); as a result, the stresses in the plates are lower and the reliability of the valve is higher. At a low pressure difference applied to the valve this factor makes it possible to widen the inlet channels at the point of plate clamping (near the immovable edge) and to reduce the resistance.

The valve illustrated in FIGS. 1, 2, 3 and realized according to the invention operates as follows.

The working fluid, e.g., gas, is fed in through the fluid inlet channels 3 and the fluid pressure bends the plates 1 towards the surfaces 11 of the seats 2 which limit their motion. Then the gas flows through the zigzag opening formed between the free edge of the tooth plate and the surface 10 with which it is in contact, mainly into the fluid inlet channels (FIG. 2) from where it moves out of the valve. The remaining portion of the outflowing gas passing through the opening between the channels 4, i.e., at the tops of the teeth 8, flows directly out of the valve.

The other valves shown in FIGS. 4, 5, 6 operate in a similar manner.

What is claimed is:

1. A uniflow valve comprising a pack of flexible plates alternating with valve seats having portions of varying thickness; the valve seats having fluid inlet channels formed in said portions of varying thickness where the fluid flows over the plate surface, at least part of the flexible plates being provided with teeth closing the fluid inlet channels on a length from the root to the top of the teeth; each having a surface contacting the plate when the valve is closed, another surface which limits the motion of an adjacent plate when the valve is open, and fluid outlet channels facing the spaces between the teeth.

2. A valve according to claim 1 wherein each plate has said teeth.

3. A valve according to claim 2 wherein each plate tooth faces one fluid inlet channel.

4. A valve according to claim 2 wherein each tooth faces several fluid inlet channels.

5. A valve according to claim 2 wherein some of the teeth face one fluid inlet channel while other teeth face several fluid inlet channels.

6. A valve according to claim 1 wherein the fluid outlet channels are located in the seat portions at the side of the surface which contacts the plates in the closed valve.

7. A valve according to claim 6 wherein the fluid outlet channels are located in the seat portions at the side of the surface which limits the motion of the plate in the open valve.

8. A valve according to claim 6 wherein the fluid outlet channels are located in the seat portions both at the side of the surface contacting the plates in the closed valve and at the side of the surface which limits the motion of the plate in the open valve.

* * * * *